United States Patent [19]
Stricklin

[11] Patent Number: 5,639,244
[45] Date of Patent: Jun. 17, 1997

[54] BI-COLORED TEACHING AND FASHION SHOELACE AND METHOD OF FABRICATING

[76] Inventor: Gooche Vann Stricklin, 2825 Van Dyke Ave., Raleigh, N.C. 27607-7021

[21] Appl. No.: 537,517

[22] Filed: Oct. 2, 1995

[51] Int. Cl.⁶ .................................................. G09B 19/24
[52] U.S. Cl. ........................... 434/260; 24/713.1; 24/712
[58] Field of Search .................. 434/260; 24/712, 24/713, 713.1, 715.3

[56] References Cited

U.S. PATENT DOCUMENTS

| | | |
|---|---|---|
| 2,182,835 | 12/1939 | Zapis ........................ 24/713.1 |
| 2,646,630 | 3/1953 | Miller . |
| 3,168,769 | 2/1965 | Smith . |
| 3,947,928 | 4/1976 | Maldonado ........................ 24/713 |
| 4,017,984 | 4/1977 | Bonfigli . |
| 4,721,468 | 1/1988 | Alexander et al. . |
| 4,764,119 | 8/1988 | Miaglia . |
| 5,110,296 | 5/1992 | Cohen . |
| 5,209,667 | 5/1993 | Stanfield . |
| 5,240,418 | 8/1993 | Silverman et al. . |

FOREIGN PATENT DOCUMENTS 6166   3/1911   United Kingdom ................... 24/715.3

Primary Examiner—Jeffrey A. Smith
Attorney, Agent, or Firm—Mills & Associates

[57] ABSTRACT

A bi-colored teaching and fashion shoelace is provided for assisting children and handicapped persons with all the difficult tasks associated with the wearing of footwear having laces. The teaching shoelace is provided with opposite end sections which are fabricated from differently colored fabrics which can be readily distinguished by children and the handicapped. The opposite end sections of the shoelace are interconnected by various fastening memos to permit the interchange of any number of differently colored end sections. The use of contrasting bright colors or patterns enables the instructor to create simple instructions based upon the dissimilar color characteristics of the training shoelace. By repetition the child or student learns to recognize characteristic color patterns when the shoe is properly laced and subsequently when a bow knot is properly formed. In addition to learning all the necessary skills involved in wearing footwear having laces, the present invention provides an opportunity for creative play through the use of aesthetic patterns and colors intended to be pleasing to a child as well a physically or mentally impaired adult. The bi-colored shoelace of the present invention may also be utilized as a sales attraction to the child and his parents seeking to purchase shoes which may be color coordinated to match a particular clothing outfit as a fashion accessory.

4 Claims, 5 Drawing Sheets

BI-COLORED TEACHING AND FASHION SHOELACE AND METHOD OF FABRICATING

FIELD OF INVENTION

This invention relates to shoelaces and, more particularly, to the use of the same as an educational device for teaching children and handicapped persons the skills necessary to lace a pair of shoes and to tie a bow knot.

BACKGROUND OF INVENTION

The use of shoes and shoelaces as educational devices for teaching young children or the handicapped the skills necessary to wearing footwear, particularly those having laces, is well known to those skilled in the art.

Such educational footwear have included indicia on the exterior of the shoes which face one another when the footwear is properly aligned on both feet. Other devices utilize colored laces cooperating with color coded eyelets to teach children how to properly lace the footwear.

Still other devices have been developed in which shoelaces retain the shape to which they are bent while permitting children to easily bend them to facilitate the tying of a bow.

Although such educational footwear devices are directed to teaching children the necessary skills required for wearing footwear, lacing and tying a shoe can become a monotonous and frustrating task for the young child or handicapped person.

DESCRIPTION OF RELATED ART

U.S. Pat. No. 5,240,418 to Jeffrey Silverman, et al. discloses a learning shoe that teaches children all of the skills attendant to wearing footwear, particularly footwear having laces. Although the shoelaces described herein are bi-colored, they are permanently connected and not interchangeable as in the present invention.

U.S. Pat. No. 5,110,296 to Martha G. Cohen discloses an educational device for teaching a child to tie a bow which includes a wooden block having an artistic image thereon generally in the form of an animal to which the child can relate. However this invention is not directed to teaching the skills necessary to lace up and tie a shoe, but rather only to tying a bow knot.

U.S. Pat. No. 2,646,630 to Edna B. Miller discloses an educational shoelace wherein the front portion of an animal is shown on one end of the lace and the rear portion of the animal on the other end of the lace so that when the lace is correctly tied the front portion of the animal is juxtaposed to the rear portion of the animal. This invention does not utilize a bi-colored lace and is directed only to tying a bow knot as opposed to teaching the skills needed to lace up and tie a shoe as in the present invention.

U.S. Pat. No. 4,017,984 to Daniel J. Bonfigli discloses an educational device for teaching one to lace shoes comprising of a pair of panel members hingedly secured to a base to simulate the side flaps of a lace-up shoe. This invention utilizes a bi-colored lace with color-coded eyelets, but the differently colored halves are not separable and interchangeable as in the present invention.

U.S. Pat. No. 4,764,119 to Lucinda J. Miraglia discloses a learning device for pre-school aged children and method of using the same whereby such child is provided with and thereafter repetitiously drilled with the hand-eye mechanics for tying a bow knot in a string or lace. Although this shoelace has opposite ends of different colors and/or textures, the ends are not separable and interchangeable as in the present invention.

U.S. Pat. No. 3,168,769 to Robert D. Smith discloses a lace for shoes and other articles including a decorative knot or buckle in the middle thereof. However, the knot or buckle is merely decorative and the ends of the lace are not separable and/or interchangeable.

U.S. Pat. No. 5,209,667 to James S. Stanfield discloses a teaching shoelace for use by young children or the handicapped, which facilitates tying of a bow by providing a moderately stiff end portion which can retain a loop shape when a pair of spaced locations on the stiff end portions are temporarily fastened together as by a pair of Velcro (i.e. hook-and-loop) retainers. This invention does not have bi-colored laces which are separable and interchangeable and merely teaches how to tie a bow knot.

Finally, U.S. Pat. No. 4,721,468 to Dean D. Alexander, et al. discloses a training shoelace for use by young children or the handicapped, which facilitates tying of a bow. The shoelace has opposite end portions which are just stiff enough to substantially retain the shape to which they are bent while permitting children to easily bend them during the tying of a bow. Although this shoelace has opposite ends of contrasting colors, the ends are not separable and interchangeable as in the present invention.

SUMMARY OF THE INVENTION

After much research and study into the above problems, the present invention has been developed to provide a teaching shoelace including an elongated body member having opposite end sections which can be readily distinguished from each other by contrasting colors.

The opposite end sections are interconnected by the use of separable fasteners allowing the opposite end sections to be readily interchanged to produce a desired color scheme. Allowing the child or student to select the color scheme gives them a sense of control in the learning process and makes the teaching shoelace user friendly.

When applied to the opposed eyelets of a traditional lace-up shoe in a conventional crossing pattern, the bi-colored laces produce a pattern of alternating colors which the student readily learns to recognize when the laces are correctly applied.

Similarly, the bi-colored end portions of the laces allow a youngster or handicapped person to follow simple instructions in conjunction with the color scheme to accomplish the task of tying a bow knot.

Further, the bi-colored end portions may be interchanged to coordinate the color scheme with a particular clothing outfit as a fashion statement or to match a student's school colors to identify and support the same.

In view of the above, it is an object of the present invention to provide a teaching shoelace that can be utilized by young children and the handicapped to learn the essential lacing and tying skills associated with the wearing of laced footwear.

Another object of the present invention is to provide a teaching shoelace which fosters the development of fine motor skills and finger dexterity and develops self-confidence in the child or handicapped person, which comes with mastering a series of complex tasks.

Another object of the present invention is to provide a teaching shoelace which not only teaches the necessary skills involved in wearing laced footwear but also provides a creative and fun activity for the student.

Another object of the present invention is to provide a bi-colored shoelace wherein the color scheme can be readily changed to utilize the shoelace as a fashion accessory.

Another object of the present invention is to provide a bi-colored shoelace which may be matched to a student's school colors to show identification and support thereof.

Other objects and advantages of the present invention will become apparent and obvious from a study of the following description and the accompanying drawings which are merely illustrative of such invention.

DESCRIPTION OF THE PREFERRED EMBODIMENT

Figure 1:
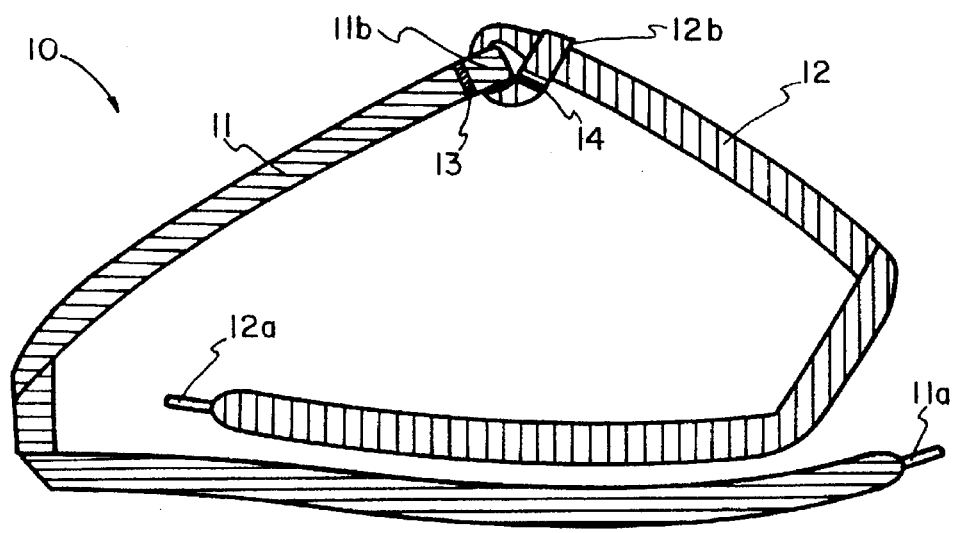
FIG. 1 is a top plan view of the teaching and fashion shoelace of the present invention color coded for red and blue as an example.

With further reference to the drawings, a teaching and fashion shoelace in accordance with the present invention is illustrated in FIG. 1 and indicated generally at 10.

In the preferred embodiment of the present invention, shoelace 10 includes an elongated body member having a first end section 11 and second end section 12 which are interconnected by suitable fastening means as described hereinafter in further detail.

The opposite end sections 11 and 12 of shoelace 10 are constructed of a woven fabric such as cotton or other suitable material.

In the embodiment shown in FIG. 1, it will be appreciated that first end section 11 and second end section 12 are each provided with elongated tip portions 11a and 12a, respectively, at their terminal ends and are each provided with loop portions, 11b and 12b respectively, at their proximal ends.

Loop portions 11b and 12b are formed by folding a predetermined length of the proximal ends of opposite end sections 11 and 12, 180 degrees and attaching the same thereto by stitching or other suitable means as at locations 13 and 14 seen in FIG. 1.

It will be appreciated by those skilled in the art that end sections 11 and 12 may be interconnected by passing the tip portion 12a of end section 12 through the loop portion 11b of end section 11 and subsequently passing the tip portion 12a back through the loop portion 12b of end section 12 and pulling the entire length of end section 12 therethrough and capturing the loop portion 11b therein.

Figure 2:
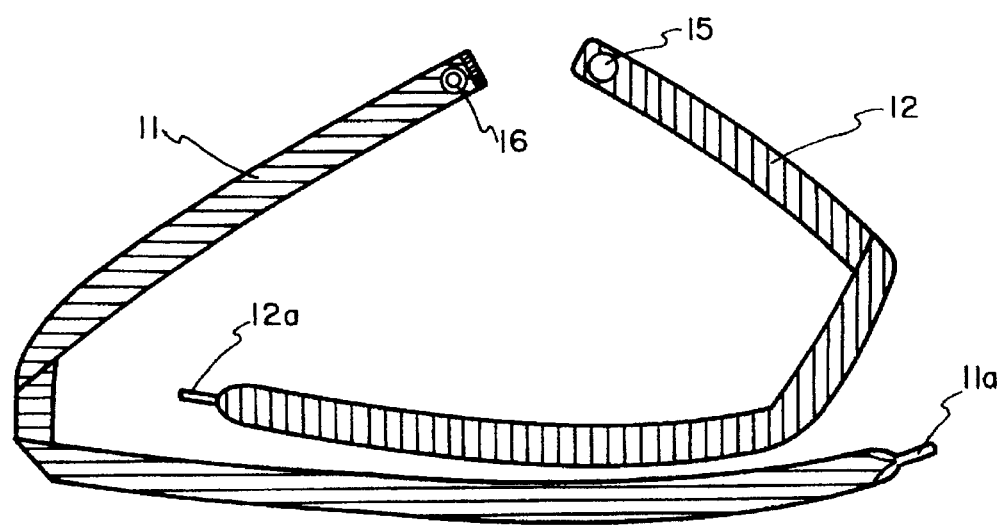
FIG. 2 is a top plan view of an alternative embodiment of the present invention showing a snap fastener interconnecting the respective end sections of the shoelace.

In an alternative embodiment of the present invention, the opposite end sections 11 and 12 may be interconnected by the use of a conventional snap fastener 15 which may be applied to a proximal end of either end section 11 or 12 for attachment with a mating male stud 16 on the opposite end section as shown in FIG. 2.

Figure 10:
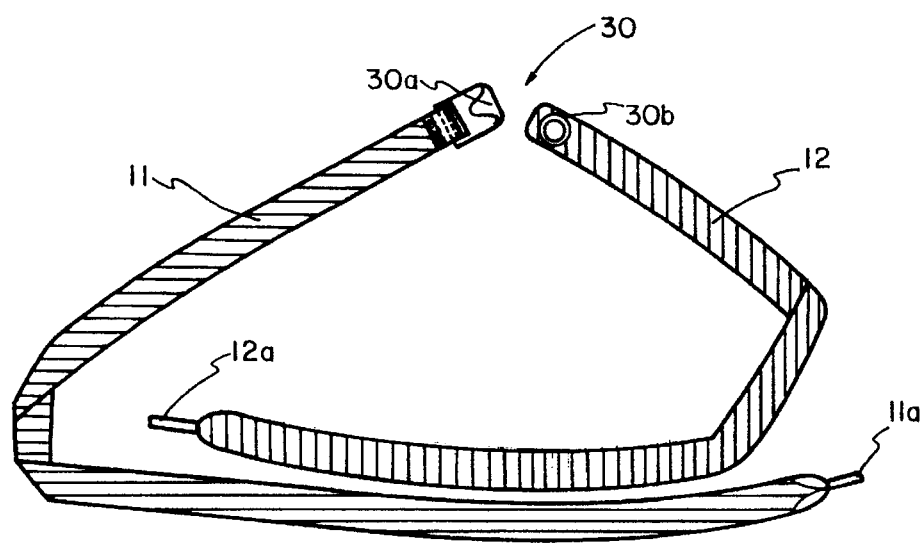
FIG. 10 is a top plan view of an alternative embodiment of the present invention showing a hook and grommet fastener for interconnecting the respective end sections of the shoelace.

In yet another alternative embodiment, the opposite end sections 11 and 12 may be interconnected by the use of a conventional hook and grommet fastener as shown in FIG. 10 and indicated generally at 30. In this embodiment a hook 30a is fixedly attached to a proximal end of end section 11 for engagement with grommet 30b installed in the proximal end of end section 12.

Various methods may be utilized for fabricating the bi-colored shoelaces 10 for use in the present invention. In a preferred method, two shoelaces of different colors, each having tip portions formed thereon are cut in half and the different colored halves are joined together utilizing the connecting means described hereinabove.

Regardless of the method utilized to fabricate shoelaces 10, it is of critical importance to the use of the present invention to provide contrasting colors between opposite end sections 11 and 12. This visual contrast may be obtained by the use of bright, contrasting colors and/or patterns for teaching purposes as well as for fashion wear.

For purposes of illustration, end section 11 is color coded for blue and end section 12 is color coded for red or pink, although any combination of contrasting colors or designs will be suitable for this purpose.

Figure 3:
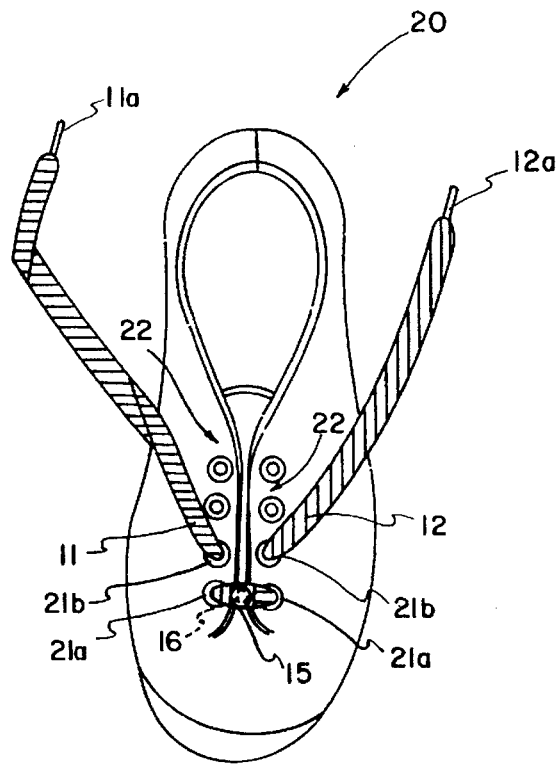
FIG. 3 is a top plan view showing the teaching shoelace initially interlaced within the eyelets of a shoe.

In practical use of the present invention, shoelace 10 is used in combination with a traditional lace-up shoe, indicated generally at 20, as shown in FIG. 3.

When used as a teaching tool, the child or student is instructed to insert the tip portions 11a and 12a of shoelace 10 into a first pair of opposed eyelets 21a in the manner shown in FIG. 3 and to draw each respective end section 11 and 12 therethrough.

It can be seen that the shoelace 10 remains centered in the shoe 20 since the snap fastener 15 between the end sections 11 and 12 will not pass through either of the pair of eyelets 21a. Thus, the end sections 11 and 12 will at all times remain equal in length.

Thereafter, the child or student is instructed to insert either tip portion 11a or 12a, distinguished by color, into the next adjacent pair of eyelets 21b crossing over to an opposite side flap, indicated generally at 22, of shoe 20 as seen in FIG. 3.

Next, the child or student is instructed to select an end section 11 or 12 of a particular color and to insert its tip portion 11a or 12a, into the next pair of opposed eyelets 21c and to draw the same therethrough, again, crossing to an opposite side flap 22, of the shoe 20. The child is instructed to cross over each previous lace with a contrasting color to produce the characteristic crisscross pattern.

Figure 4:
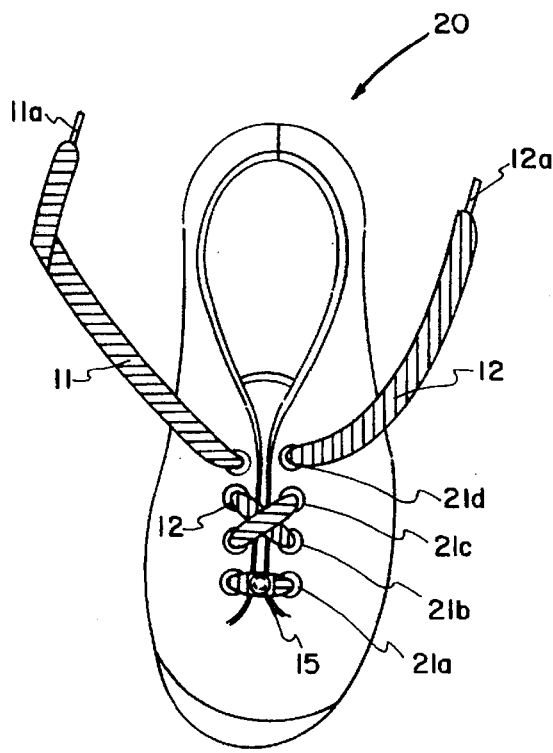
FIG. 4 is a top plan view showing the teaching shoelace completely interlaced within the eyelets of a shoe.

Subsequently, the child is instructed to repeat this crisscross procedure with the next adjacent pair of opposed eyelets 21c until the lacing is completed as shown in FIG. 4.

By the alternate placement of the bi-colored shoelace 10, the child will quickly discover that the laces are to be crossed from side to side in an alternating pattern of colors.

This repetitive pattern of eye-hand movement and alternating colors may be incorporated into a story or poem to provide an opportunity for creative play during the learning process.

Similarly, the student may learn to tie a bow knot, indicated generally at 25, by following instructions based on the contrasting colors of opposite end sections 11 and 12.

Figure 5:
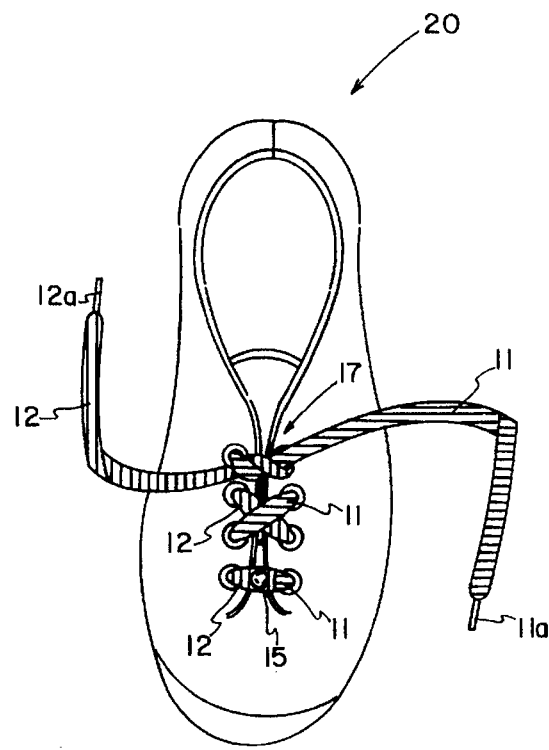
FIG. 5 is a top plan view showing the teaching shoelace formed into a half-knot on a shoe.

Thus, while the student is grasping opposed end sections 11 and 12, she is requested to wrap one section, for example, section 11 first over and then under the other end section, for example, section 12 as shown in FIG. 5. This instruction is given by identifying the contrasting colors of opposite end sections of 11 and 12 such as, for example, by asking the child to take the blue section 11 and pass it over and then under the red section 12 when such contrasting colors are used. This step creates the half-knot indicated generally at 17, seen in FIG. 5.

Figure 6:
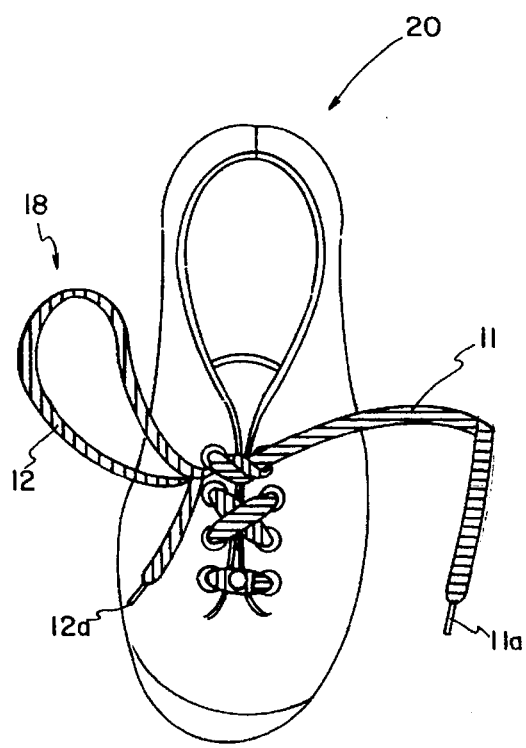
FIG. 6 is a top plan view of the teaching shoelace on a shoe having a first loop formed therein.

Next, the student is instructed to take the red section 12 and double it back on itself to create a first loop indicated generally at 18 as shown in FIG. 6.

Figure 7:
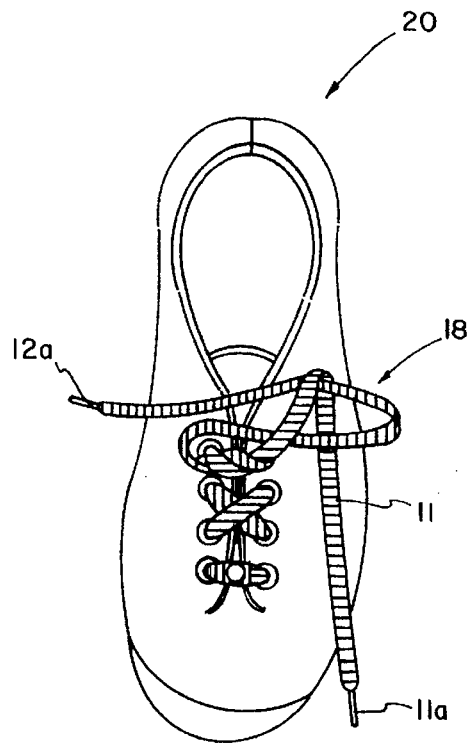
FIG. 7 is a top plan view showing the teaching shoelace on a shoe having a first loop folded under a second end section thereof.

The red loop 18 is then laid across the blue section 11 and the blue section 11 is folded down over the top of the red loop 18 as shown in FIG. 7.

Figure 8:
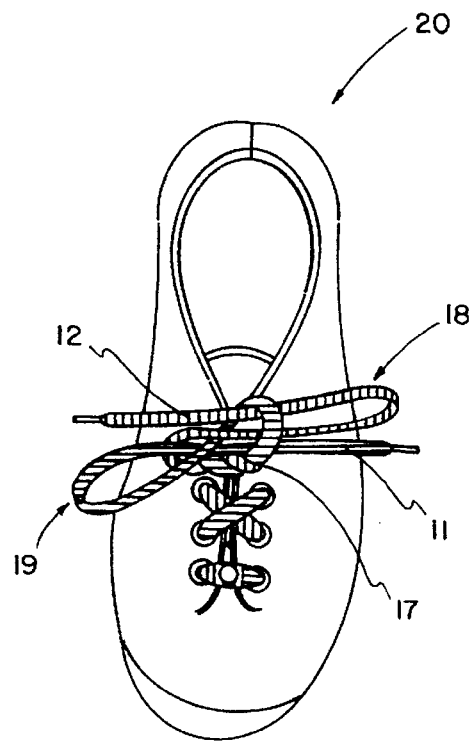
FIG. 8 is a top plan view showing the teaching shoelace on a shoe having a first loop and a second loop formed therein.

Next, while grasping the red loop 18 in one hand (not shown) just above the half-knot 17 so that loop 18 is spaced away therefrom, the student is requested to double over the blue end section 11 to form a second loop 19 and to feed that loop 19 into the opening defined by and in between loop 18 and half-knot 17, as shown in FIG. 8.

Figure 9:
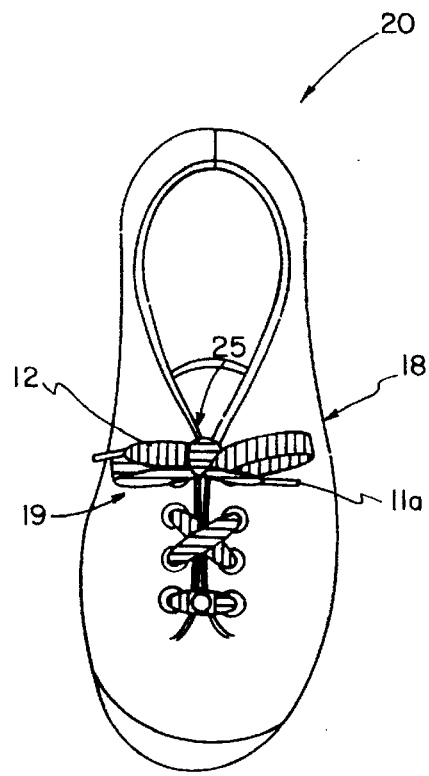
FIG. 9 is a top plan view showing the teaching shoelace on a shoe having a bow knot formed therein.

Finally, the student is requested to grasp the end of the red loop 18 between the thumb and forefinger (not shown) of one hand and the end of the blue loop 19 between the thumb and forefinger (not shown) of the other hand and draw his hands apart thereby enlarging the loops and tightening the wrap around the loops 18 until the loops are snugly secured against half-knot 17 to complete the bow knot, indicated generally at 25, shown in FIG. 9.

As previously described, the bi-colored shoelace 10 can be incorporated into a story or rhyme based on the finger movements and contrasting colors to provide an opportunity for creative play which will be fun for the child.

From the above it can be seen that the bi-colored teaching shoelace of the present invention provides a simple and useful device for teaching children and the handicapped the skills associated with the wearing of shoes having laces.

In addition to assisting with the development of motor skills and dexterity, the bi-colored shoelace of the present invention provides an opportunity for creative play combined with instruction which makes the teaching shoelace user friendly.

Finally, the bi-colored shoelace may be utilized as a sales attraction for children and adults alike, which can be color coordinated as a fashion accessory. The color-coded laces may also be matched to a student's school colors to show school identity and support thereof.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A bi-colored teaching and fashion shoelace for use in combination with footwear requiring laces comprising:

an elongated body member including a first end section and an opposite second end section, each respective end section having a proximal end and a distal end, said opposite end sections being removably coupled at said proximal ends thereof; and connecting means interposed between said proximal ends of said first end section and said second end section permitting each respective end section to be interchanged with another end section of a different color having compatible connecting means, said connecting means comprising a conventional snap fastener including a male element installed at said proximal end of said first section and a mating female element installed on said proximal end of said second section to join said opposite end sections together.

2. A bi-colored teaching and fashion shoelace for use in combination with footwear requiring laces comprising:

an elongated body member including a first end section and an opposite second end section, each respective end section having a proximal end and a distal end, said opposite end sections being removably coupled at said proximal ends thereof; and connecting means interposed between said proximal ends of said first end section and second end section permitting each respective end section to be interchanged with another end section of a different color having compatible connecting means, said connecting means comprising a conventional hook and grommet fastener including a hook element installed at said proximal end of said first end section and a mating grommet element installed on said proximal end of said second end section to join said opposite end sections together.

3. The method of fabricating a bi-colored shoelace for use in combination with footwear requiring laces, said method comprising:

cutting a plurality of shoelaces of different colors in half, said shoelaces having tips formed thereon;

forming a loop on each of the cut ends of said shoelaces by folding a predetermined length of each of said cut ends 180 degrees onto itself and stitching the same thereto, said loop being adapted to receive a tip portion of a differently colored shoelace therein for joining said differently colored halves together; and interconnecting any two of said plurality of differently colored cut shoelaces having said loop formed thereon to form a bi-colored shoelace of a desired color scheme.

4. The method of fabricating a bi-colored shoelace for use in combination with footwear requiring laces, said method comprising:

cutting a plurality of shoelaces of different colors in half, said shoelaces having tips formed thereon;

installing a conventional snap fastener on said cut ends of said differently colored half shoelaces, said snap fastener including a male element and a mating female element for joining said differently colored halves together; and interconnecting any two of said plurality of differently colored shoelaces having compatible male and female elements to form a bi-colored shoelace of a desired color scheme.

* * * * *